United States Patent [19]
Boulton et al.

[11] Patent Number: 4,773,069
[45] Date of Patent: Sep. 20, 1988

[54] ROBUST ROOTED TREE NETWORK

[76] Inventors: P. I. P. Boulton, 66 Wimbleton Road, Islington, Ontario M9A 3S1; E. S. Lee, 15 Westridge Road, Islington, Ontario M9A 4E6, both of Canada

[21] Appl. No.: 890,827

[22] Filed: Jul. 30, 1986

[51] Int. Cl.⁴ .............................................. G06F 11/18
[52] U.S. Cl. .......................................... 371/7; 371/11; 370/16; 340/825.01
[58] Field of Search .............................. 371/8, 11, 9, 7; 340/825.01, 825.05, 825.16, 825.5, 827, 825.02; 375/8, 38, 40; 370/60, 93, 16; 379/221; 364/187, 200 MS File, 900 MS File

[56] References Cited
U.S. PATENT DOCUMENTS

| | | | |
|---|---|---|---|
| 4,347,498 | 8/1982 | Lee et al. | 340/825.02 |
| 4,417,334 | 11/1983 | Gunderson | 370/16 X |
| 4,570,162 | 2/1986 | Boulton et al. | 340/825.5 |
| 4,701,756 | 10/1987 | Burr | 370/16 X |

Primary Examiner—Jerry Smith
Assistant Examiner—Robert W. Beausoliel
Attorney, Agent, or Firm—Fleit, Jacobson, Cohn & Price

[57] ABSTRACT

A data transmission network has a plurality of modems to transmit and receive data and a nexus including at least two controllers to control the transmission of data between the modems. Each controller has input ports and output ports with each of the modems being connected to an input port and an output port means on each of the controllers to permit the passage of data between the modems and the controllers. Each of the controllers has one of its outputs connected to an input port of the other of the controllers so that data transmitted by one of the controllers will be transmitted to the input port of another of said controllers. Switches are provided between the controllers to prevent continuous circulation of data between the controllers.

8 Claims, 6 Drawing Sheets

ROBUST ROOTED TREE NETWORK

The present invention relates to local area networks.

Local area networks are networks of data generating devices that allow the transfer of data from one device to another within the network. There are various configurations of network but one of the more flexible networks is the hierarchial star or rooted tree network. In such a network each of the data generating devices is connected through a controller, also known as "a hub", to each of the other devices. Each controller includes a selector to select the data of one of the devices and a broadcaster that broadcasts the selected data to each of the devices.

With this configuration the output of the selector of one controller can in fact provide an input to a selector of another controller so that large numbers of devices can be connected into the network.

While such networks provide advantages of simple station design, the accommodation of many stations and long links to remote stations, together with excellent performance over a wide range of loads, the use of a central controller that controls the broadcast of the selected packet of data introduces a weakness where a single failure of a controller or of associated transmission lines can disrupt communications over a large portion of the network.

Accordingly it is an object of the present invention to provide a local area network in which the above disadvantages are obviated or mitigated.

In general terms, the present invention introduces redundancy into the network by duplicating the controllers and having each device connected to each controller. An output from each controller is connected as the input to another controller so that data transmitted by one of the controllers is also transmitted to an input of the other of the controllers. In this way a fault in one of the hubs or in a transmission line between one of the modems and the controllers will not result in a breakdown of communications within the network.

It is preferred that an inhibiting switch is provided in the connection between the output of one controller and the input of another to ensure that the same packet of data does not recycle through the controllers. This is of concern where packets of data that are shorter than the transmission path may be transmitted.

Embodiments of the invention will now be described by way of example only with reference to the accompanying drawings in which FIG. 1 is a schematic representation of a local area network FIG. 2 is an enlarged view of the central hub unit of the local area network shown in FIG. 1

Figure 1:
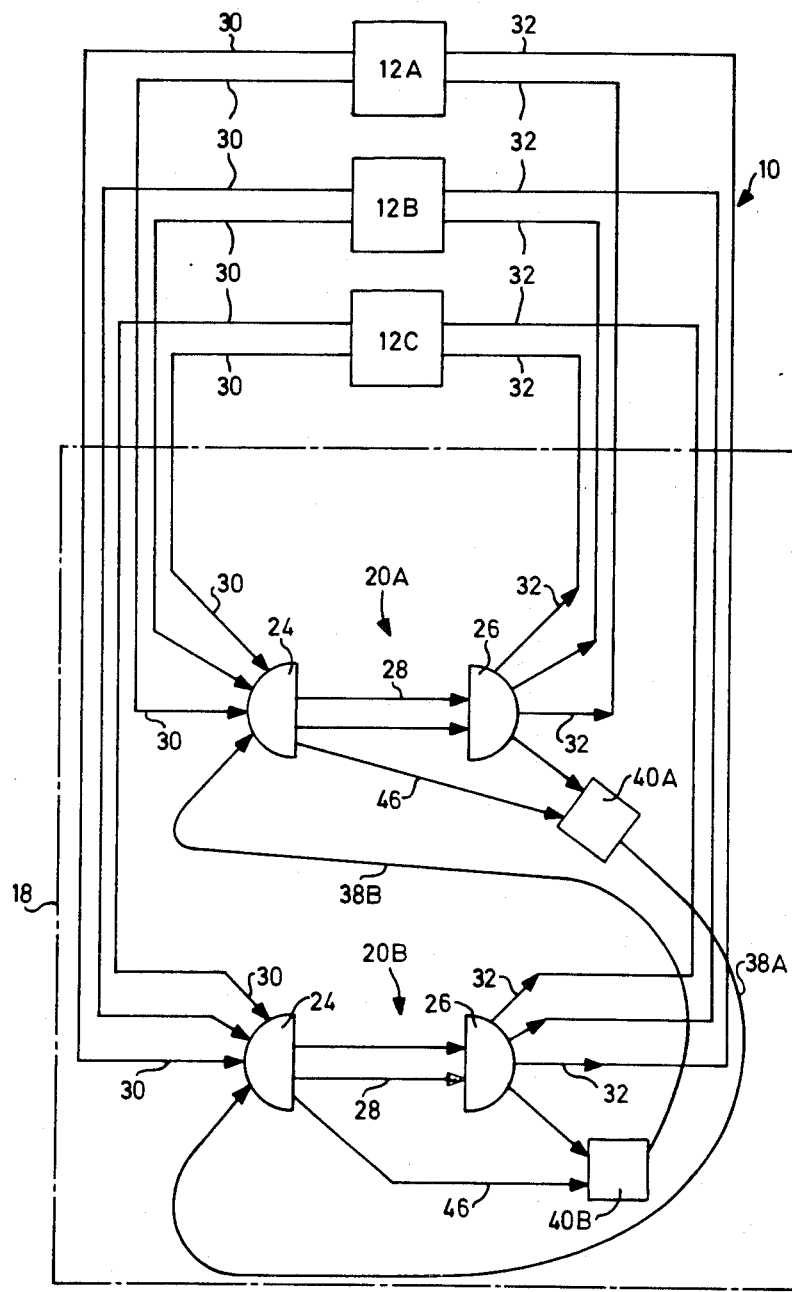
Figure 2:
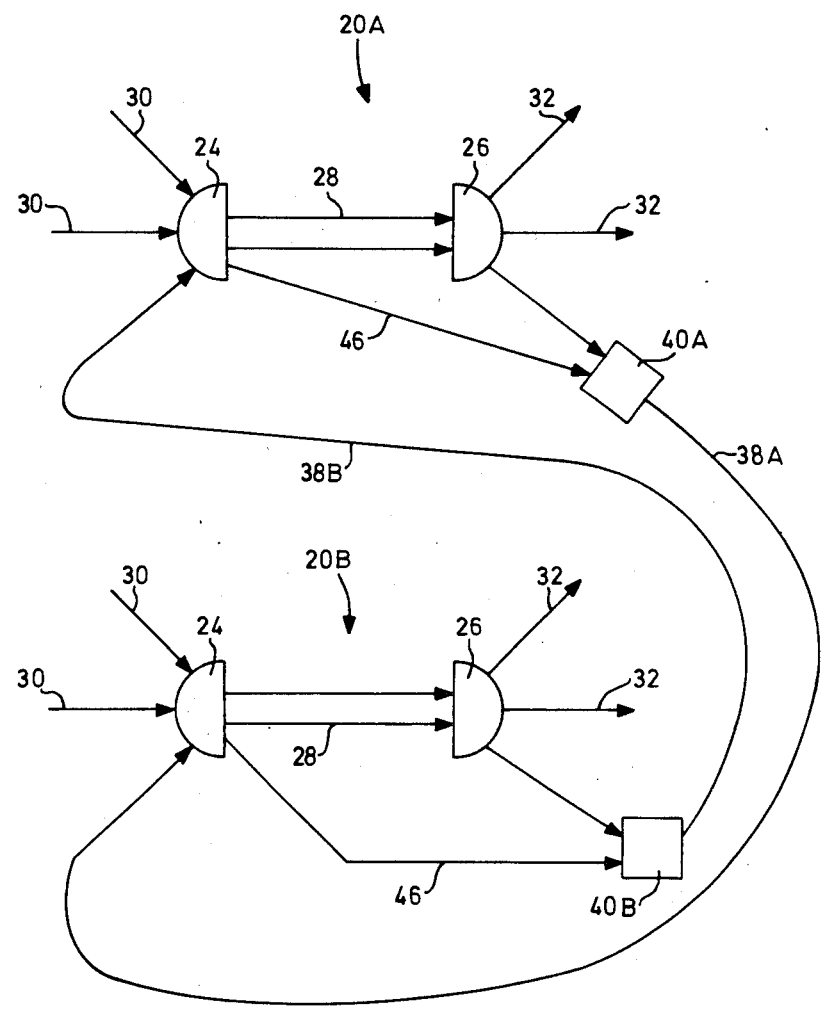

Referring, therefore, to FIG. 1, a local area network 10 includes three modems 12A, 12B, 12C, respectively, each connected to a central communications control unit 18. Each of the modems 12A, 12B, 12C are associated with respective data generating devices (not shown) such as a computer, and enable transmission of data as is well known. The communications control unit 18 comprises a pair of controllers 20A, 20B, each of which includes a selector 24 and a broadcaster 26 interconnected by a nexus 28.

Each of the modems 12 is connected to each of the controllers 20, by a transmission link 30, and receiving link 32, with the transmission links 30 being connected to respective input ports 34 on the selector 24 and the receiving links 32 being connected to respective output ports 36 on the broadcaster 26. Thus, in the embodiment shown in FIG. 1, each modem 12 is associated with a pair of transmission links 30 and a pair of receiving links 32, one of each being connected to controller 20A and the other being connected to controller 20B. One of the output ports 36 of controller 20A is connected by a connecting link 38A to an input port 34 of controller 20B through a switch device 40A. Similarly, an output port 36 of controller 20B is connected through a connecting link 38B incorporating a switch device 40B to the input port 34 of controller 20A. Each of the switch devices 40 is controlled by a switching signal line 46 derived from the selector 24 of the associated controller 20.

Figure 3:
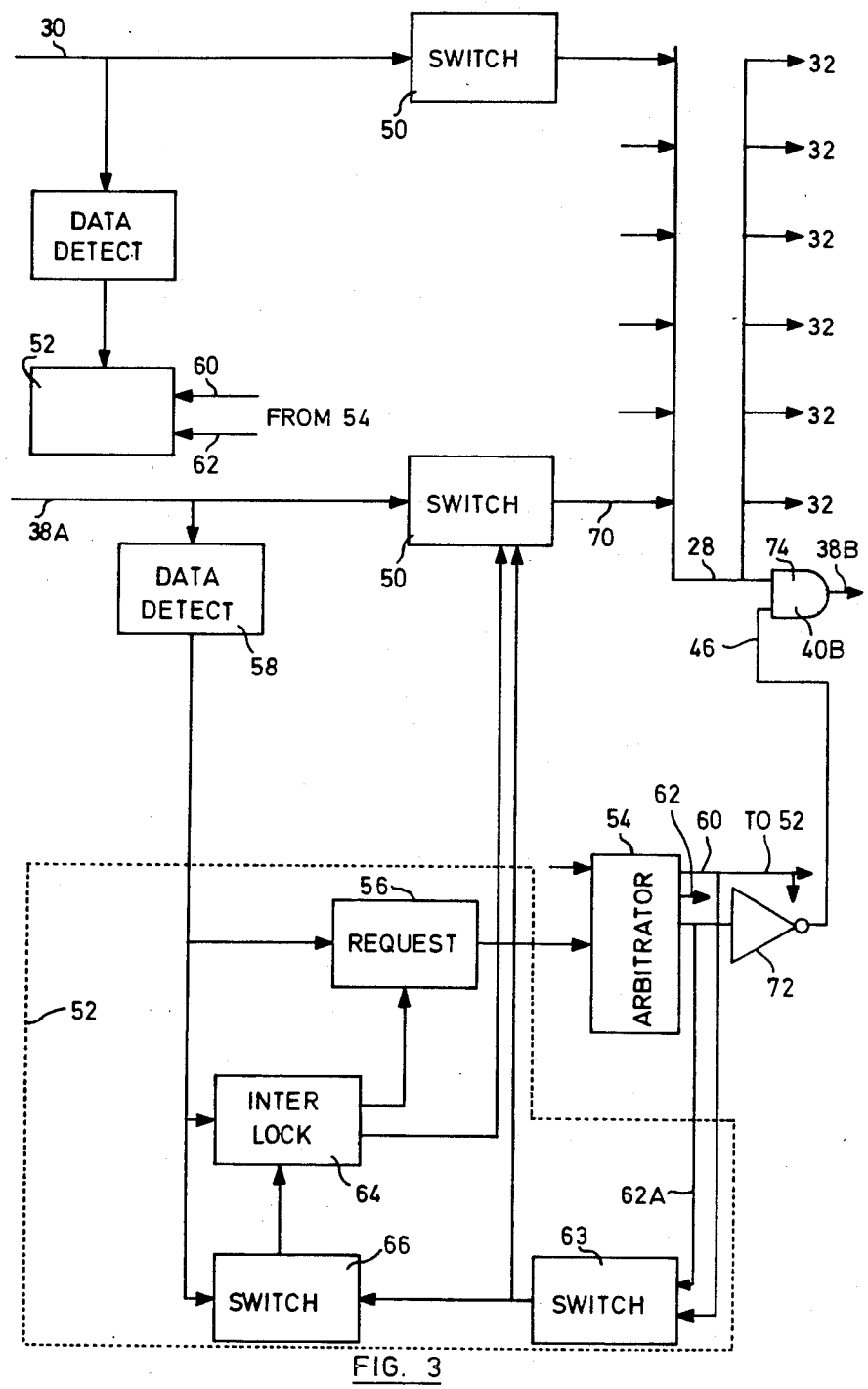
FIG. 3 is a schematic representation of the selector used in the hub unit shown in FIG. 2

Each of the controllers 20A, 20B is similar to the selector and arbitrator shown in U.S. Pat. No. 4,570,162 to Boulton et al., and assigned to the assignee of the present application, the contents of which are incorporated herein by reference. Each selector 24 includes, as shown in FIG. 3, a switch function 50 and selection device 52 for each modem and an arbitrator 54 that operates on request signals generated by the selection device 52 to control the switch function 50. Each transmitting link 30 is connected through switch function 50 to the output 70 of the selector 24 to form nexus 28. In each selector, access to the output 70 is controlled by a request function 56 that receives an input from a data detect function 58 and requests through the arbitrator 54 access to the output 70 of the selection means. The arbitrator 54 is connected to the request function of each of the links 30 and determines which one of the links 30 will be connected to the output 70 of the selection means. The arbitrator 54 has two output functions 60, 62, one of which 60 is common to all the selection devices 52 and indicates when the output 70 is in use. The second function 62 is individual to each selection device 52 and indicates if the associated link 30 has been chosen for access to the output 70. The functions 60, 62 control, through a switch 63, the request function 56 and switch 50 so enabling signals are provided only when the ouput 70 is not occupied and its link has been selected for transmission. The selected function 62 is necessary to override the busy function 60 to maintain the enabling signs to request function 56 and switch 50 despite the busy function 60 indicating that the output 70 is in use.

Enablement of the request function 56 is controlled by an interlock function 64 which is necessary to prevent a portion of a data packet being transmitted should the output 70 become available during transmission of the data packet. The interlock function 64 is controlled by switch 66 that receives control signals from the data detect function 58 and the busy function 60. The interlock function 64 is enabled, i.e. conditioned to prevent access to the request function, if the output 70 is in use by another link 30 as indicated by the busy function 60 and is locked in the enabled condition if a data transmission starts on the associated link 30 whilst the nexus 28 is occupied. Upon termination of both the data transmission and the occupation of the ouput 70, the interlock 64 will be disabled to permit access to the request function 56.

Thus, upon start of a data transmission with the output 70 available an indication that data is being transmitted is received at request function 56 that requests access to the ouput 70 through arbitrator 54. The arbitrator selects the link 30 and generates a busy signal to disable all the other request functions and a seleted signal for the selected one of links 30. The request function 56 and switch 50 associated with the selected link 30 is thus enabled to allow data to flow to the output 70. The interlock 64 remains disabled as the signal from the switch 63 indicates that the link 30 has been selected. Should however the output 70 be occupied at the time of the start of data transmission, the request function 56 and switch 50 will be disabled by the signal of busy function 60. The interlock 64 is also enabled to prevent enabling of the request function until after the data transmission in link 30 has ended.

It is believed that the implementation of the schematic representation of the selector shown in FIG. 3 need not be described in further detail in view of the detailed description of these components in U.S. Pat. No. 4,570,162.

One of the selected functions, indicated at 62a, corresponds to the input 34 connected to connecting line 38A and is connected through an invertor 72 to the signal line 46. The output 70 forms the input to broadcaster 26 and thus is connected to each of the receiving links 32 and to the connecting link 38B. An AND gate 74 is located in the connecting link 38B to function as the switch 40B. The link 38B forms one input of the AND gate 74 with the signal line 46 forming the other input.

In operation, one of the modems, for example 12, will transmit a data packet through each of the transmission lines 30, to be received at the selectors 24 of each of the controllers 20A, 20B. Assuming no other data is being transmitted and the nexus 28 is available for transmission, the input 34 associated with modem 12 will be selected and transmitted through the output 70 to each of the transmission links 32. The data will thus be transmitted to each of the modems 12A, 12B and 12C, where the modem will discriminate between the two data packets being sent to process only one of the packets.

The data packet will also be transmitted on the connecting links 38A, 38B to be presented to respective input ports 34 of the controllers 20A, 20B. However, because the output 70 is busy the data carried on either of lines 38 will not be accepted for re-transmission.

In the event that the data packet transmitted from the modem 12 is of sufficiently short duration, it is feasible that the transmission through output 70 will have ceased before the packet arrives through one of the connecting links, e.g. 38A, to its respective input 34. In this event the selector will connect the associated input 34 with the output 70. Once the input 34 associated with the connecting link 38A is selected, the output 62a associated with connecting link 38A will go high so that a low signal will appear at one input to the AND gate 74. This inhibits transmission of the data packet along the connecting link 38B so that continuous recirculation of the data packet is prevented.

Provided the input corresponding to connecting link 38 is not selected the output 62a remains low so that a high signal appears at the AND gate 74. This will enable the data packet to be transmitted through the connecting links 38.

Should a fault occur in one of the transmission lines 30 connected to, for example, controller 20A, then the duplicate line 30 will operate with controller 20B to broadcast along the receiving links 32 connected to that controller. Moreover, the data packet will be transmitted through the connecting link 38B to the controller 20A where it will be selected for transmission through the transmitting lines 32. However, transmission across connecting link 38A will be inhibited by a signal on line 46. This ensures that if there is a fault in one of the transmitting lines connected to one of the controllers, and a fault in the receiving line connected to the other controller, the data packet will still be received at each modem.

If one of the controllers malfunctions, for example 20A, then the duplicate controller 20B will ensure broadcast of the data packet to each of the modems 12.

It will be seen, therefore, that a duplication of the controllers 20 with the provision of the connecting links 38 provides an inherent fault tolerance for the system. Moreover, the provision of the switches 40 ensures that a recirculating data packet cannot monopolize the network.

Figure 4:
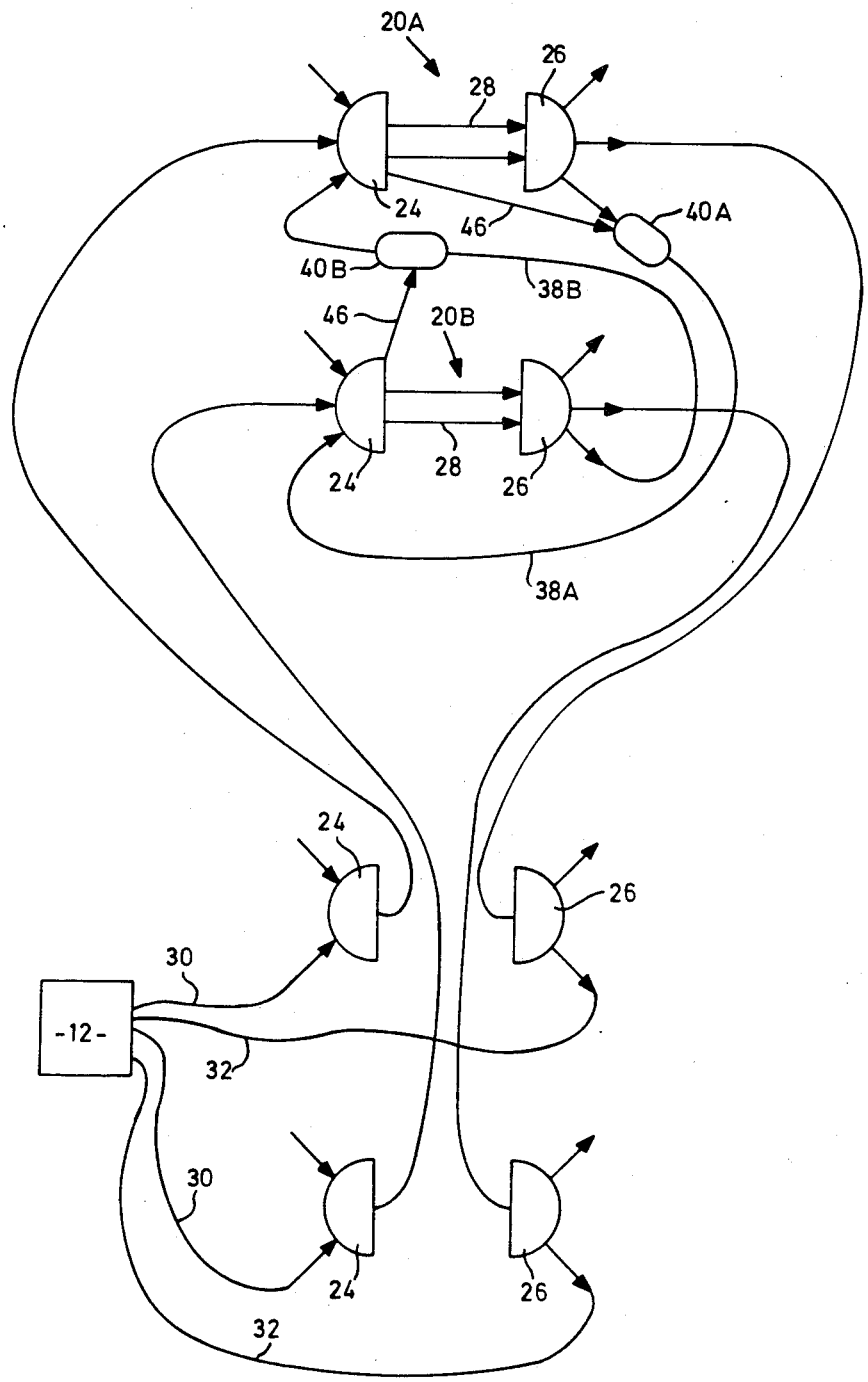
FIG. 4 is a schematic representation similar to FIG. 1 showing a higher order local area network.

As may be seen from FIG. 4, in higher order networks one or more of the modems can be constituted by selectors 24 of controllers. In each case, a modem 12 is connected to the selectors 24 of two controllers, with the outputs of each selector being connected to an input of the central hub. In this way more extensive networks can be provided with the fault tolerance indicated in FIG. 1.

Figure 5:
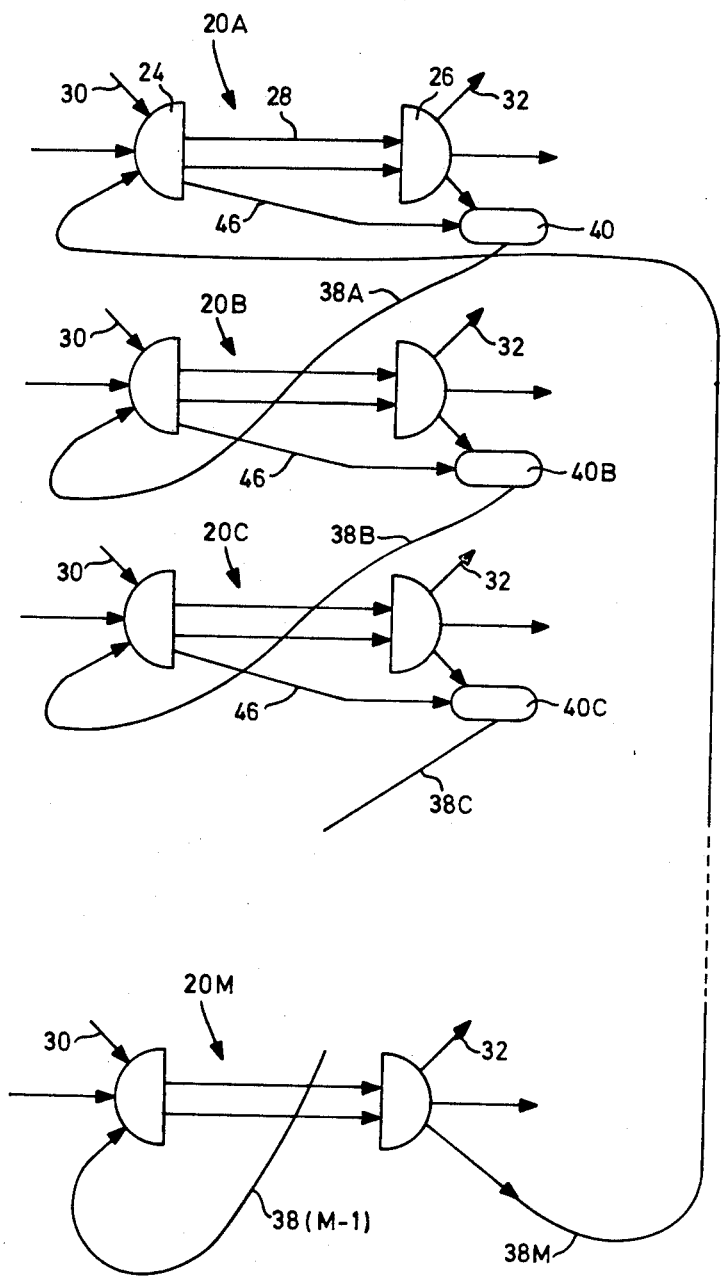
FIG. 5 is a representation similar to FIG. 4 showing a configuration of a network exhibiting increased fault tolerance

Higher orders of fault tolerance can be provided by implementing the cental node arrangement shown in FIG. 5. In this arrangement an output of each controller 20 is connected to the input of another of controllers 20. With M such controllers connected in this way, M-1 fault tolerance is provided. However, each modem must be connected to each of the M controllers to provide this fault tolerance.

It is possible, and in some cases desirable, that some of the modems 12 be connected to all M controllers 20, while others may be connected to a subset of these M controllers 20. The fault tolerance achieved for signals to or from any modem 12 is determined by the number of controllers 20 to which it is connected.

Figure 6:
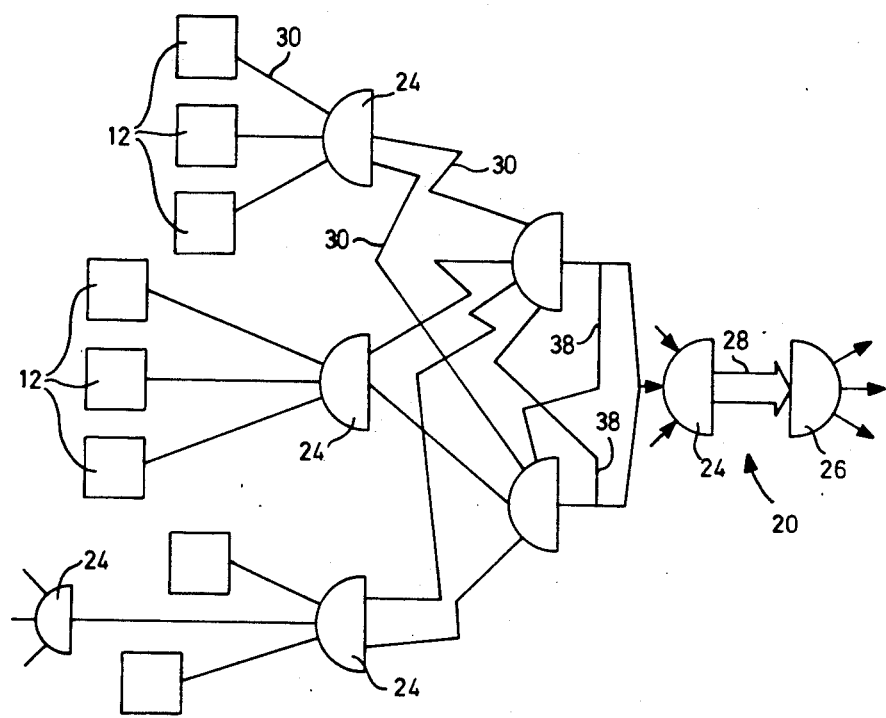
FIG. 6 is a representation similar to FIG. 4 showing an alternative configuration of network.

One particular benefit of the system shown in FIGS. 1 through 5 is that it may be applied selectively to critical areas in a network rather than to the network as a whole. Thus the fault tolerant node shown in FIG. 5 could be applied only to the central node with the balance of the network having the normal characteristics as shown in the earlier U.S. patent. Alternatively, as indicated in FIG. 6, the fault tolerant mode could be employed at a remote location in a network with the central node or hub being of the form shown in the above mentioned patent.

Since the modems 12 receive transmission from each of the controllers 20, or some subset of them to which they are connected, each such reception received may be recorded by the modem. In some circumstances, the receptions will be duplicates of the same data, in which case one instance of the data may be forwarded to the computer or other device to which the modem 12 is connected. In other cases, the data received by modem 12 on the transmission paths 32 may differ. This occurs when two different selectors 24 select different data more or less simultenaeously and transmit it more or less simultaneously over their associated nexus 28 to be broadcast to all modems 12. When different data are received, one copy of each instance of such data may be forwarded to the computer or other device to which the modem 12 is connected for subsequent processing. This more or less simultaneous reception of different data at a modem is most likely to occur at high load, when the network is being requested to transmit many packets more or less at the same time. The result of it is an apparent increase in the maximum rate at which the network can transmit data, since more than one data instance is being received by a modem more or less simultaneously.

Whilst the fault tolerance has been shown applied to the selector exemplifed in U.S. Pat. No. 4,570,162, it is applicable to other forms of selectors used with star networks, for example that shown in U.S. Pat. No. 4,347,498 to Lee et al.

We claim:

1. A data transmission network having a plurality of modems to transmit and receive data and a nexus including at least two controllers to control the transmission of data between said modems, each controller having an input port means and an output port means, each of said modems being connected to said input port means and said output port means on each of said controllers to permit the passage of data between said modems and said controllers, each of said controllers having its output connected by connecting means to the input port means of another of said controllers whereby all data transmitted by one of said controllers will be transmitted by one of said connecting means to the input port of another of said controllers.

2. A data transmission network according to claim 1 including inhibiting means to inhibit operation of one of said connecting means upon data carried by one of said connecting means being transmitted from the input port means to the output means of one of said controllers.

3. A data transmission network according to claim 2 wherein said inhibit means is operable upon the connecting means associated with the output means of said one controller.

4. A data transmission network according to claim 3 wherein each of said connecting means has an inhibiting means associated therewith.

5. A data transmission network according to claim 4 wherein each of said controllers includes a plurality of discrete inlet ports and selection means to select one of said input ports for transmission to said output port means, said selection means being operable on said inhibiting means upon an inlet port connected to one of said connecting means being selected by said selection means.

6. A data transmission network according to claim 5 wherein said selection means includes arbitrator means to select one of said inlet ports and provide an output signal indicative of the inlet port selected, said output signal being operable to disable the balance of said imput ports.

7. A data transmission network according to claim 6 wherein said output signal is operable to control said inhibiting means.

8. A data transmission network according to claim 1 wherein at least one of said modems is the output port means of another controller having input port means connected to respective modems.

* * * * *